(12) United States Patent
Lahr

(10) Patent No.: US 7,878,935 B2
(45) Date of Patent: Feb. 1, 2011

(54) CONTINUOUSLY VARIABLE TRANSMISSION WITH EXTERNAL CAM

(75) Inventor: Derek Frei Lahr, Blacksburg, VA (US)

(73) Assignee: Derek Lahr, Blacksburg, VA (US)

( * ) Notice: Subject to any disclaimer, the term of this patent is extended or adjusted under 35 U.S.C. 154(b) by 550 days.

(21) Appl. No.: 11/986,782

(22) Filed: Nov. 26, 2007

(65) Prior Publication Data

US 2009/0137356 A1    May 28, 2009

(51) Int. Cl.
*F16H 15/48* (2006.01)
(52) U.S. Cl. .................... 475/185; 475/186; 475/195
(58) Field of Classification Search .................. 475/183, 475/185, 186, 195, 214
See application file for complete search history.

(56) References Cited

U.S. PATENT DOCUMENTS

| | | | |
|---|---|---|---|
| 2,159,739 A | | 5/1939 | Johnson |
| 3,524,362 A | * | 8/1970 | Hugel ......................... 74/640 |
| 4,487,085 A | | 12/1984 | Collins |
| 4,487,090 A | * | 12/1984 | Burnham .................... 475/183 |
| 4,644,828 A | | 2/1987 | Kozakae |
| 4,665,773 A | | 5/1987 | Hiramatsu et al. |
| 4,680,985 A | | 7/1987 | Troester |
| 4,802,376 A | | 2/1989 | Stidworthy |
| 4,885,949 A | | 12/1989 | Barber, Jr. |
| 4,903,536 A | | 2/1990 | Salisbury, Jr. et al. |
| 4,909,101 A | | 3/1990 | Terry, Sr. |
| 4,983,151 A | | 1/1991 | Pires |
| 5,007,298 A | | 4/1991 | Machida |
| 5,046,375 A | | 9/1991 | Salisbury, Jr. et al. |
| 5,046,996 A | * | 9/1991 | Horvath ...................... 475/197 |
| 5,051,106 A | * | 9/1991 | Fritsch ....................... 475/192 |
| 5,129,272 A | | 7/1992 | Irvin |
| 5,207,114 A | | 5/1993 | Salisbury, Jr. et al. |
| 5,820,510 A | | 10/1998 | Ueda et al. |
| 6,044,718 A | | 4/2000 | Lester |
| 6,045,477 A | | 4/2000 | Schmidt |

(Continued)

OTHER PUBLICATIONS

D. F. Lahr, D. W. Hong, The Operation and Kinematic Analysis of a Novel Cam-Based Infinitely Variable Transmission, ASME 2006 Internation Design Engineering Technical Conferences & Computers and Information in Engineering Conference, Sep. 10-13, 2006, pp. 1-6 and presentation, Philadelphia, Pennsylvania, USA.

(Continued)

*Primary Examiner*—Ha D. Ho
(74) *Attorney, Agent, or Firm*—Kathleen Harleston

(57) ABSTRACT

A continuously variable transmission includes: (a) at least one external, three-dimensional cam; (b) at least four follower assemblies, each including a planet pulley, a roller shaft, and at least one follower roller, the roller shaft being mounted on the planet pulley, the roller shaft being connected to the follower roller; (c) at least two sun assemblies, each including a sun pulley, at least one sprag clutch, and a differential pulley, the differential pulley being mounted to the sun pulley, the sun pulley driving the sprag clutch; (d) an input assembly including a sun pulley shaft, the sun pulley shaft being connected to the at least two sun pulley assemblies through the respective sprag clutches; and (e) at least one differential mechanism connecting each of the sun pulleys to at least two of the planet pulleys; wherein the cam is external to the follower assemblies.

20 Claims, 14 Drawing Sheets

U.S. PATENT DOCUMENTS

| | | | |
|---|---|---|---|
| 6,062,096 | A | 5/2000 | Lester |
| 6,371,881 | B1 | 4/2002 | Benitez et al. |
| 6,425,301 | B1 | 7/2002 | Rubenstein |
| 6,561,941 | B2 | 5/2003 | Nakano et al. |
| 6,723,016 | B2 | 4/2004 | Sumi |
| 6,835,153 | B2 | 12/2004 | Naude |
| 6,849,023 | B1 | 2/2005 | Kerr |
| 6,958,029 | B2 | 10/2005 | Inoue |
| 7,004,487 | B2 | 2/2006 | Matsumoto et al. |
| 7,011,600 | B2 | 3/2006 | Miller et al. |
| 7,036,620 | B2 | 5/2006 | Miller et al. |
| 7,100,466 | B2 | 9/2006 | Naude |
| 7,105,964 | B2 * | 9/2006 | Miyazaki et al. .......... 310/75 R |
| 7,125,297 | B2 | 10/2006 | Miller et al. |
| 7,166,056 | B2 | 1/2007 | Miller et al. |
| 7,169,076 | B2 | 1/2007 | Miller et al. |
| 7,188,719 | B2 | 3/2007 | Kerr |
| 7,198,585 | B2 | 4/2007 | Miller et al. |
| 7,211,014 | B2 | 5/2007 | Naude |
| 7,232,395 | B2 | 6/2007 | Miller et al. |
| 7,235,031 | B2 | 6/2007 | Miller et al. |
| 7,238,136 | B2 | 7/2007 | Miller et al. |
| 7,238,137 | B2 | 7/2007 | Miller et al. |
| 7,238,138 | B2 | 7/2007 | Miller et al. |
| 7,250,018 | B2 | 7/2007 | Miller et al. |
| 2003/0060318 | A1 | 3/2003 | Sumi |
| 2003/0221892 | A1 | 12/2003 | Matsumoto et al. |
| 2004/0003672 | A1 | 1/2004 | Rubenstein |
| 2004/0142785 | A1 | 7/2004 | Inoue |
| 2005/0009661 | A1 | 1/2005 | Kerr |
| 2005/0209032 | A1 | 9/2005 | Aitcin |
| 2006/0084549 | A1 | 4/2006 | Smithson et al. |
| 2006/0154774 | A1 | 7/2006 | Naude |
| 2006/0160657 | A1 | 7/2006 | Magyari |
| 2007/0105671 | A1 | 5/2007 | Binello et al. |

OTHER PUBLICATIONS

J. D. Shigley, C. R. Mischke, R. G. Budynas, Load and Stress Analysis, Mechanical Engineering Design, pp. 161-163, 2004, McGraw-Hill, New York, USA.

D. M. Tsay, G. S. Hwang, The Profile Determination and Machining of Camoids with Oscillating Spherical Followers, Journal of Engineering for Industry, ASME, Aug. 1994, vol. 116, p. 355-362, Republic of China.

J. J. Uicker, G. R. Pennock, J. E. Shigley, Theory of Machines and Mechanisms, Cam Design, 2003, Oxford University Press, New York, USA.

F. Schillebeeckx, J. Peirs, W. Van De Vijver, D. Reynaerts, Compact Zero-Vacklash Tilt-Pam Mechanism Based on Differential Gear Technology, Actuator, 2004, Jun. 14-16, 2004, p. 641-644, Bremen, Germany.

D. F. Lahr, D. W. Hong, Current and Future Methods of Contact Stress Reduction in the Cam-Based Infinitely Variable Transmission, ASME IDETC Conference, p. 1-8, Sep, 2007, Las Vegas, Nevada, USA.

J. Naude, Radical innovative CVT technology - A Fixed Chain based CVT, pp. 1-8, http://www.barloworld-cvt.com, South Africa, Oct. 20, 2007.

D. F. Lahr, D. W. Hong, Dimensional Synthesis of a Cam-Based Infinitely Variable Transmission Using Genetic Algorithms, pp. 1-6, USA, Aug. 9, 2007.

* cited by examiner

CONTINUOUSLY VARIABLE TRANSMISSION WITH EXTERNAL CAM

BACKGROUND OF THE INVENTION

1. Technical Field

The present invention relates to a continuously variable transmission with an external, three-dimensional cam and at least four active follower assemblies.

2. Background Information

For a given transmission size, it has been found in the past that contact stress is a limiting factor for the torque capacity of a cam based continuously variable transmission. While other highly stressed components can be resized in order to somewhat accommodate high loads, such as sprag clutches, the input shaft, and the planetary gear system, it has been found herein that the cam and the roller system have a greater effect on overall transmission size. This is because these are the most highly stressed components in the system. In fact, the cam is the largest single component in the continuously variable transmission. It has been found that increasing cam size in order to accommodate larger stresses is to increase the nominal size of the continuously variable transmission as well.

It has been found herein that content stress can be significantly reduced by doubling the number of follower rollers under load at any given time, and by modifying the overall topology of the mechanism to incorporate an inverted and external can surface that surrounds the rest of the mechanism. A unique cable differential, which preferably splits the input torque evenly between two followers in the continuously variable transmission of the present invention, allows for two active followers and therefore loaded follower rollers. Inverting the cam in the present transmission provides a larger radius of curvature, and a more complementary surface for the follower roller to follow.

The spherical roller of the continuously variable transmission of the present invention is on the inner rather than the outer surface of the cam. In addition to the cam being larger as compared to an internal cam, contact stress improvements result from a now negative radius of curvature since the spherical roller is now on the inner surface of the external cam. It has been found herein that contact area between the roller and cam is increased, with less deformation of the roller.

The use of an external cam offers several other improvements in terms of packaging. With an internal cam, there was a large region of space inside the cam which could not be utilized. With the external cam, this space is moved to the outside of the continuously variable transmission, freeing up a large amount of space on the inside. Being as such, the shifting mechanism can be moved to the inside, and the size of the more highly stressed components can be increased while the overall transmission size remains the same.

Although this continuously variable transmission has a uniform output velocity given a constant input, a significant problem with the early prototypes was the non-uniform torque output. This was the result of the heavy follower return springs storing and releasing energy as they held the followers to the cam. Because of the initial internal cam design, large springs were needed to hold the rather massive followers to the cam at high velocities. In addition, the higher follower acceleration required with the dual active followers exacerbated the problem. Indeed, it was experimentally determined that even heavier springs were needed then were built into the design. As such, the external cam will reduce or eliminate the need for large springs because the inertia of the followers will naturally force them onto the cam surface. Therefore lighter springs can be used which are required to only maintain tension in the cables of the cable differential. The torque fluctuations can then be almost entirely eliminated in future prototypes.

BRIEF SUMMARY OF THE INVENTION

The present invention is a continuously variable transmission, which includes: (a) at least one external, three-dimensional cam; (b) at least four follower assemblies, each of the follower assemblies comprising a planet pulley, a roller shaft, and at least one follower roller, the roller shaft being mounted on the planet pulley of the same follower assembly, the roller shaft being connected to the at least one follower roller; (c) at least two sun assemblies, each of the sun assemblies comprising a sun pulley, at least one sprag clutch, and a differential pulley, the differential pulley being mounted to the sun pulley of the same sun assembly, the sun pulley driving the at least one sprag clutch of the same sun assembly; (d) an input assembly comprising a sun pulley shaft, the sun pulley shaft being connected to the at least two sun pulley assemblies through the respective sprag clutches; and (e) at least one differential mechanism connecting each of the sun pulleys to at least two of the planet pulleys; wherein the cam is external to the follower assemblies.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
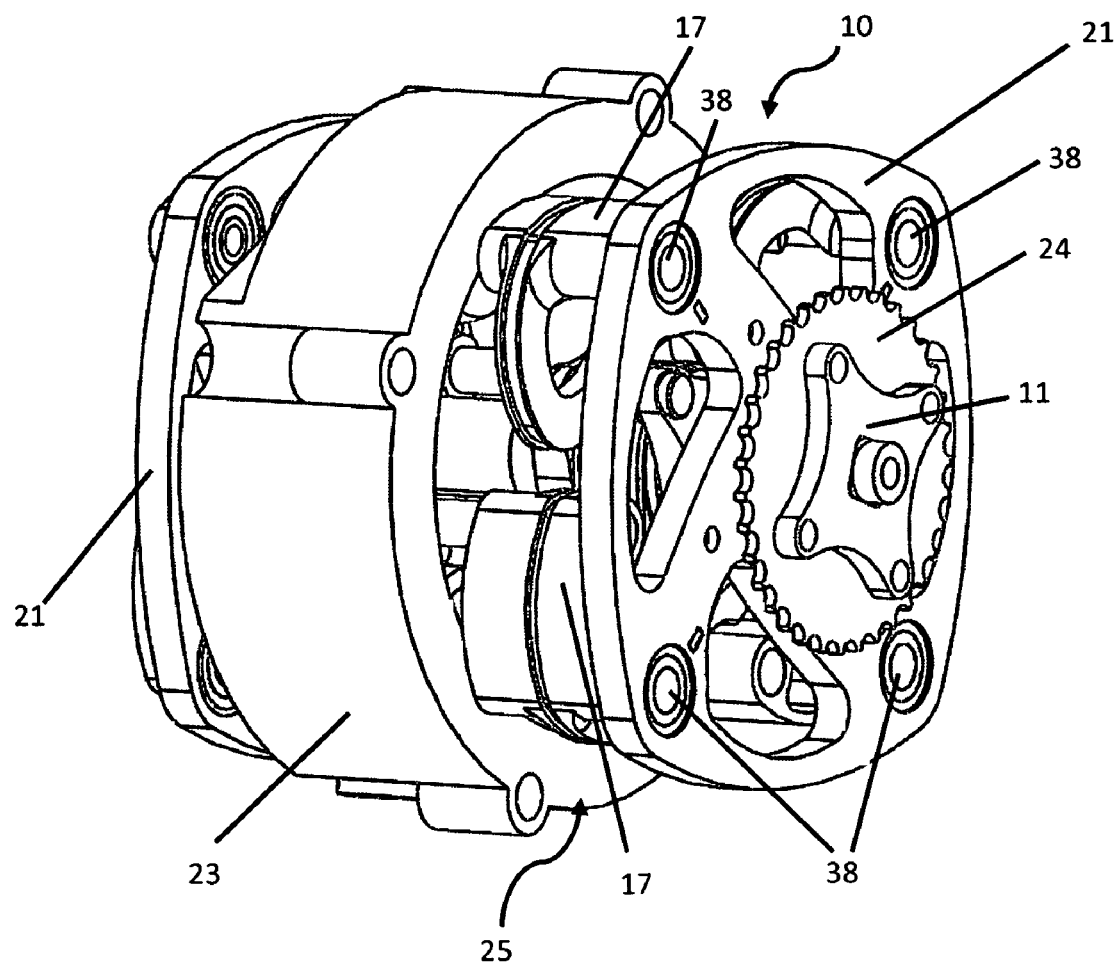
FIG. 1 is a perspective view of a continuously variable transmission according to the present invention, shown fully assembled.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Figure 2:
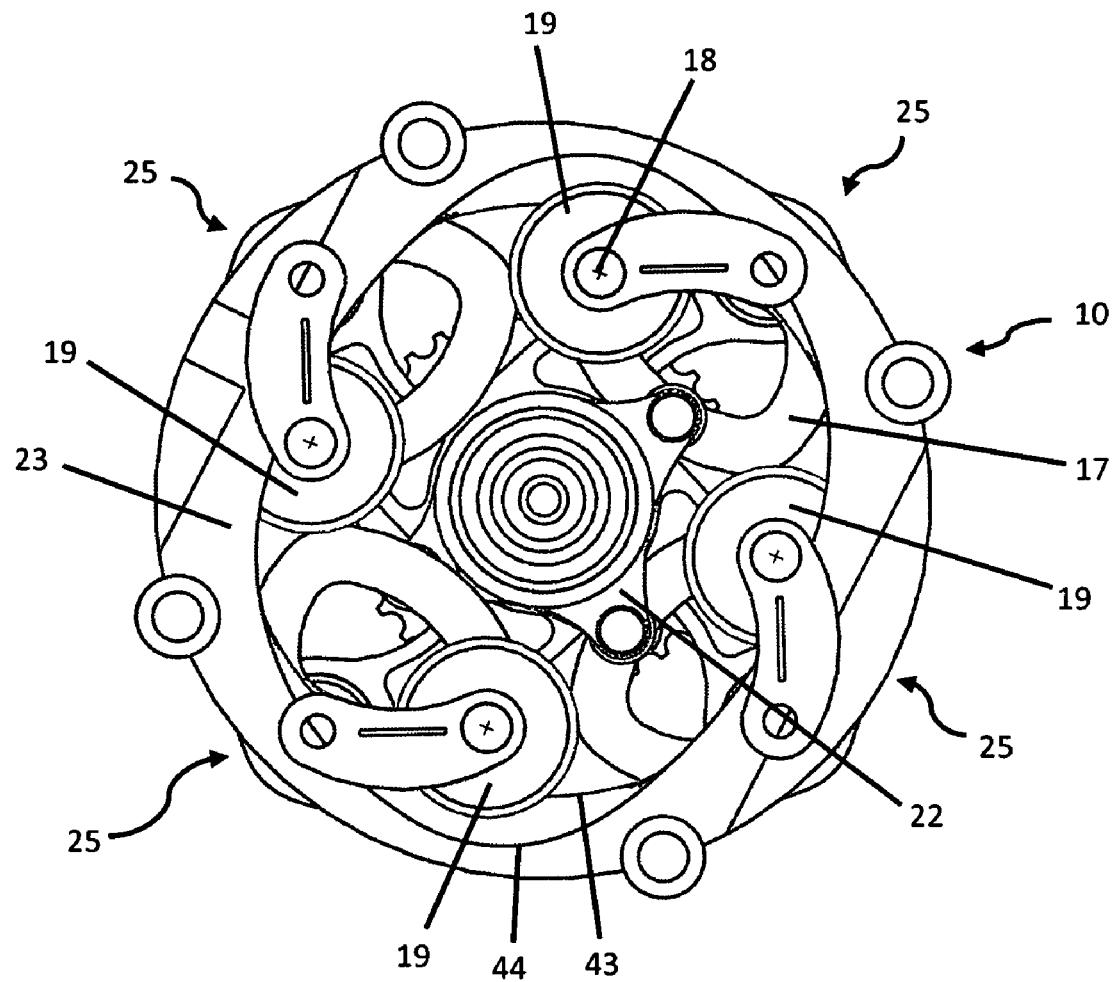
FIG. 2 is a side elevational view of a continuously variable transmission according to the present invention, shown without one carrier for purposes of illustration.
Figure 3:
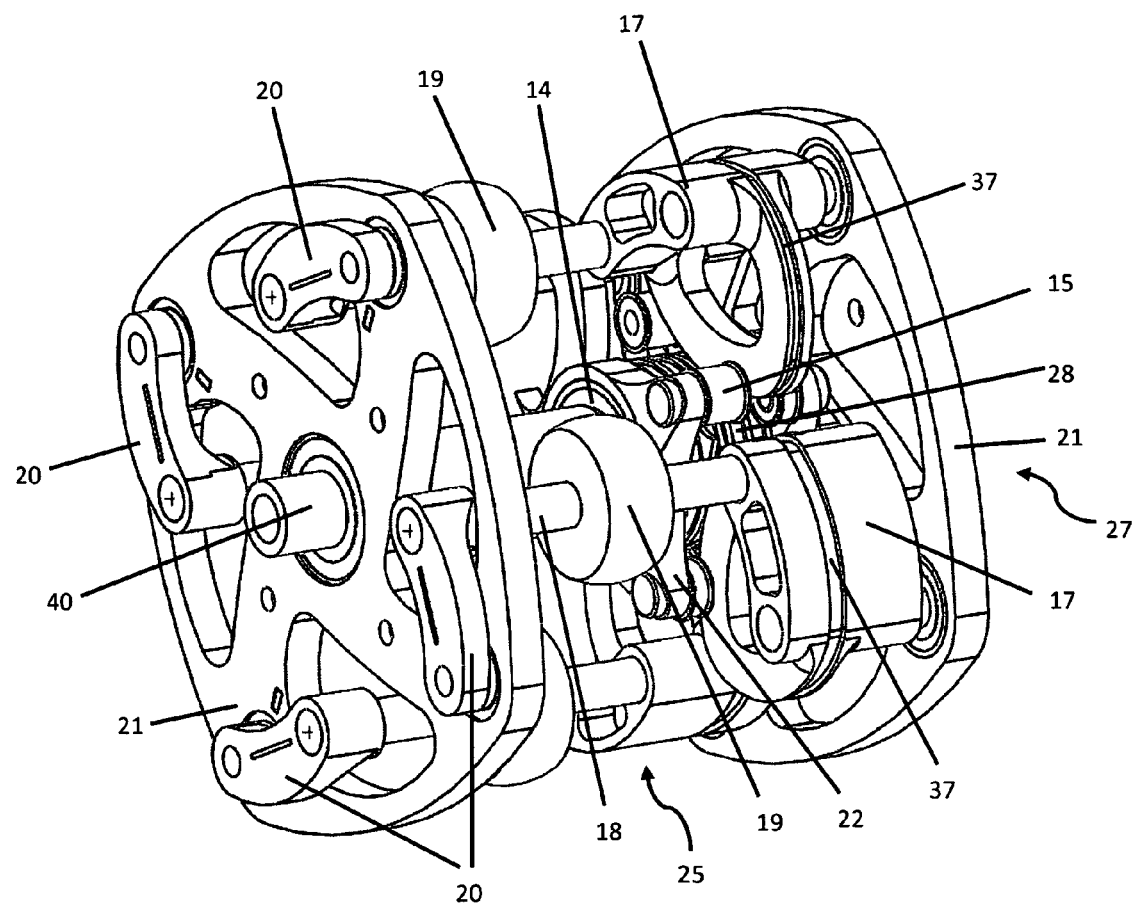
FIG. 3 is a side perspective view of a continuously variable transmission according to the present invention, shown without a cam for purposes of illustration.

Turning first to FIGS. 1 through 3, a continuously variable transmission according to the present invention, which is generally referred to herein as 10, includes an external cam 23 and several active followers. The continuously variable transmission 10 comprises: 1) at least one external, three-dimensional cam 23; 2) at least four follower assemblies 25; 3) at least two sun assemblies 27; 4) an input assembly 26; and 5) a differential mechanism 42. In regard to the latter, the differential mechanism 42 is preferably a cable differential mechanism connecting each of the sun pulleys 22 to at least two of the planet pulleys 17. In regard to the second component, each follower assembly 25 includes a planet pulley 17, a roller shaft 18, at least one follower roller 19, and preferably a roller shaft support 20. The roller shaft 18 is mounted on the planet pulley of the same follower assembly, and the roller shaft 18 is connected to the at least one follower roller 19. The cam 23 is external to the follower assemblies 25.

In regard to the third component, each sun assembly 27 includes a sun pulley 22, at least one sprag clutch 14, and a differential pulley 15, and preferably a sun pulley bearing 13 and a differential cable guide pulley 16. The differential pulley is mounted to the sun pulley of the same sun assembly. In each sun assembly 27, the sun pulley 22 drives the sprag clutch(es) 14.

In regard to the fourth component, each input assembly 26 includes a sun pulley shaft 12. The sun pulley shaft is connected to the sun pulley assemblies through the respective sprag clutches. It preferably extends through corresponding holes in the sun pulleys 22 of the sun assemblies 27.

The continuously variable transmission preferably also includes at least one, and preferably two, suitable carriers 21, a like number of input spiders 11, and a transmission ratio adjustment mechanism. The carriers 21 support the follower assemblies. One carrier 21 extends between the input spider 11 and a corresponding sun assembly 27. The second carrier is rotatably affixed to the transmission support member 40. The sun pulley shaft 12 extends through a corresponding hole in the input spider 11. The input to the continuously variable transmission 10 is the sun pulley shaft 12, and an output from the continuously variable transmission is the carrier 21. Alternatively, the input to the continuously variable transmission 10 is preferably the carrier 21, and the output is the sun pulley shaft 12.

This continuously variable transmission is a new type of ratcheting infinitely variable transmission based on a three-dimensional cam and follower system that produces a constant velocity output for a constant velocity input. The continuously variable transmission 10 incorporates a compact, lightweight, and capable differential mechanism that doubles the number of followers in contact with the cam 23 at any time, thereby considerably reducing contact stress between the followers 25 and the cam surface. The external cam 23 has an internal cam surface with a predominately negative radius of curvature, which reduces contact stress between the follower rollers 19 and the cam 23.

Figure 4:
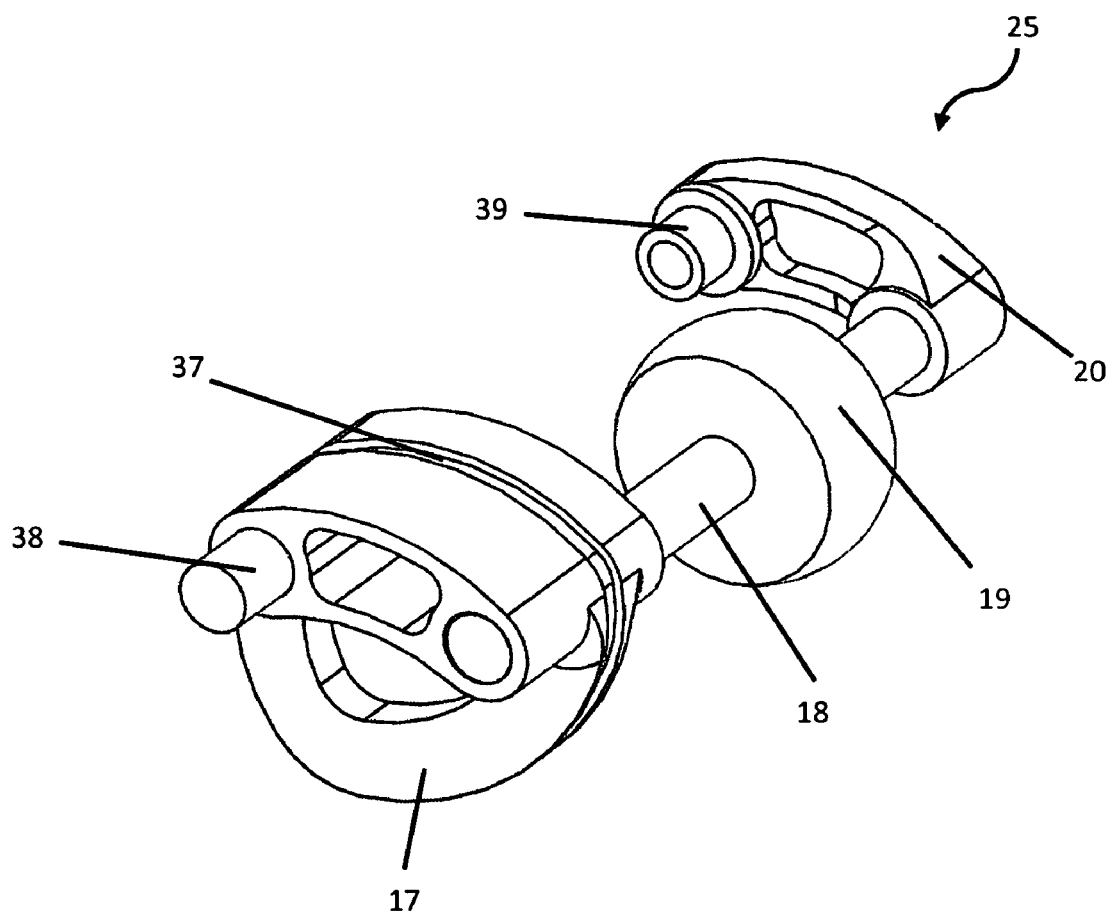
FIG. 4 is a perspective view of a follower assembly of a continuously variable transmission according to the present invention.
Figure 5:
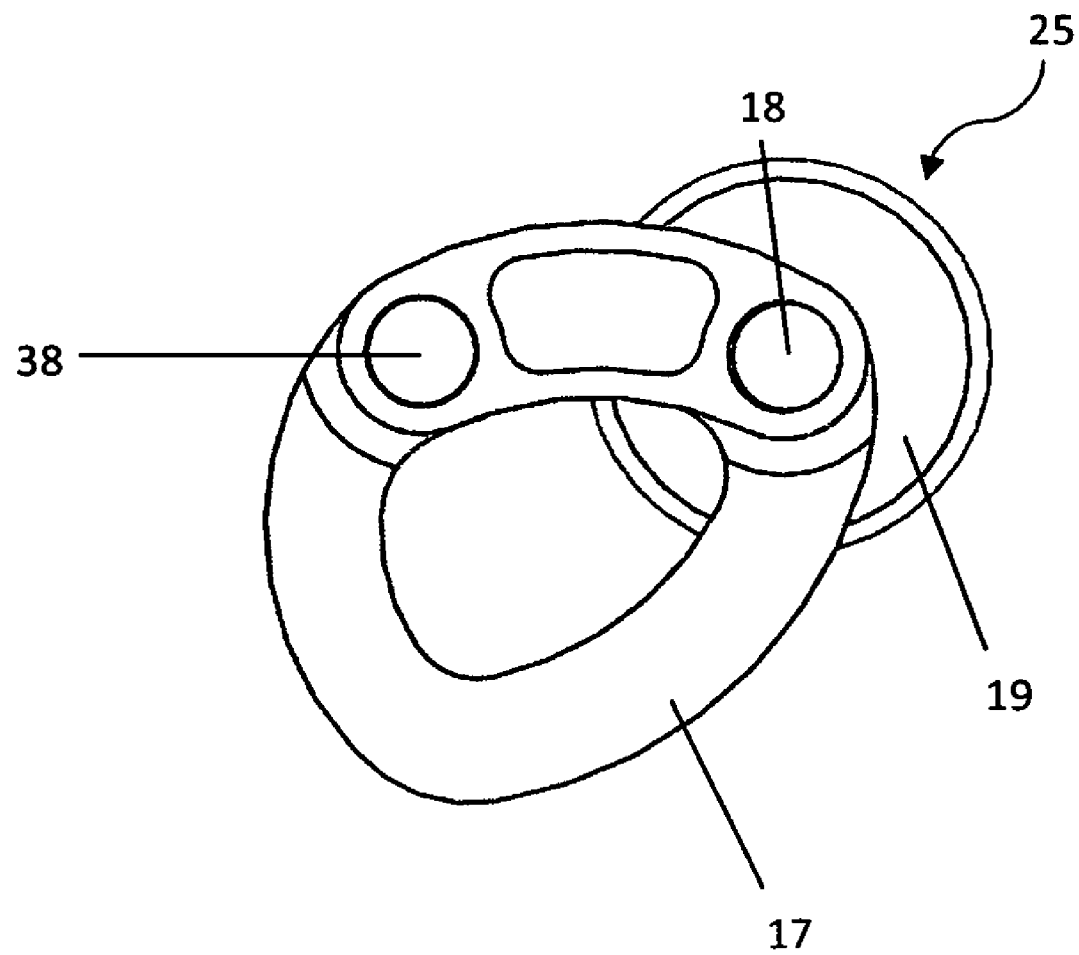
FIG. 5 is an end view of the follower assembly of FIG. 4.

As shown in FIGS. 4 and 5, each follower assembly 25 includes a planet pulley 17, a roller shaft 18, a follower roller 19, and a roller shaft support 20. The roller shaft 18 extends through same-sized holes in the planet pulley 17, the follower roller 19, and the roller shaft support 20, with the follower roller 19 between the planet pulley 17 and the roller shaft support 20. A roller shaft support pivot 39 in the roller shaft support 20 accommodates a bearing that supports that end of the follower assembly 25. The end of the follower assembly 25 is moveably affixed to the carrier 21 on each end of the continuously variable transmission 10 by a bolt or the like. A planet pulley pivot shaft 38 extends through a circular aperture in the planet pulley 17. The planet pulley pivot shaft 38 substantially parallels the roller shaft 18, as seen in FIG. 4.

The planet pulley 17 is generally stirrup-shaped, as seen in FIG. 5. As seen in FIGS. 3 and 4, the planet pulley 17 includes a planet pulley groove 37. The planet pulley groove 37 extends around the midsection on the side wall of the planet pulley 17 in each follower assembly 25, and is parallel to the opposite edges of the side wall of the planet pulley. When the continuously variable transmission 10 is in use, a cable extends around the periphery of the planet pulley 17, guided by the planet pulley groove 37. The rotational axis of the follower roller 19 is parallel to the rotational axis of the follower assembly 17. The entire follower assembly 25 rotates. Four follower assemblies 25 are rotating when the continuously variable transmission 10 is engaged.

As seen in FIG. 4, the follower assembly 25 has a squared off "U" shape (resembling a square without the top side). This "square U" shape is believed to be an important contributor to the efficiency of the continuously variable transmission 10. The base of the "square U" is formed by the roller shaft 18. Without meaning to be bound by theory it is believed that this "square U" shape permits a smaller cam size than has been possible heretofore. The follower assembly 25 has been placed so that the rotational axis of the follower assembly 25 intersects the cam 23. There is nothing in the "square U" shape that interferes with the cam 23. In contrast, the rotational axis in a conventional transmission would intersect the cam, preventing its use. The follower roller 19 is mounted on the roller shaft 18 so that it rotates and translates along the roller shaft when the transmission is operating The axis of rotation of the follower assembly 25 intersects the external cam 23 or is even outside of the external cam. The follower roller 19 is mounted on the roller shaft 18 so that the follower roller rotates and translates along the roller shaft when the continuously variable transmission is operating. The roller shaft 18 on which the follower roller 19 is mounted is parallel at a distance to the axis of rotation of the follower assembly 25.

The follower rollers 19 preferably have either a spherical shape or an elliptical shape. Follower rollers 19 with an elliptical shape have an axis of rotation collinear with the major axis (longitudinal axis) of the follower rollers. By "external cam" is meant that the external cam 23 is external to, or outside and adjacent, the four follower assemblies 25, as seen in FIG. 1.

Figure 6:
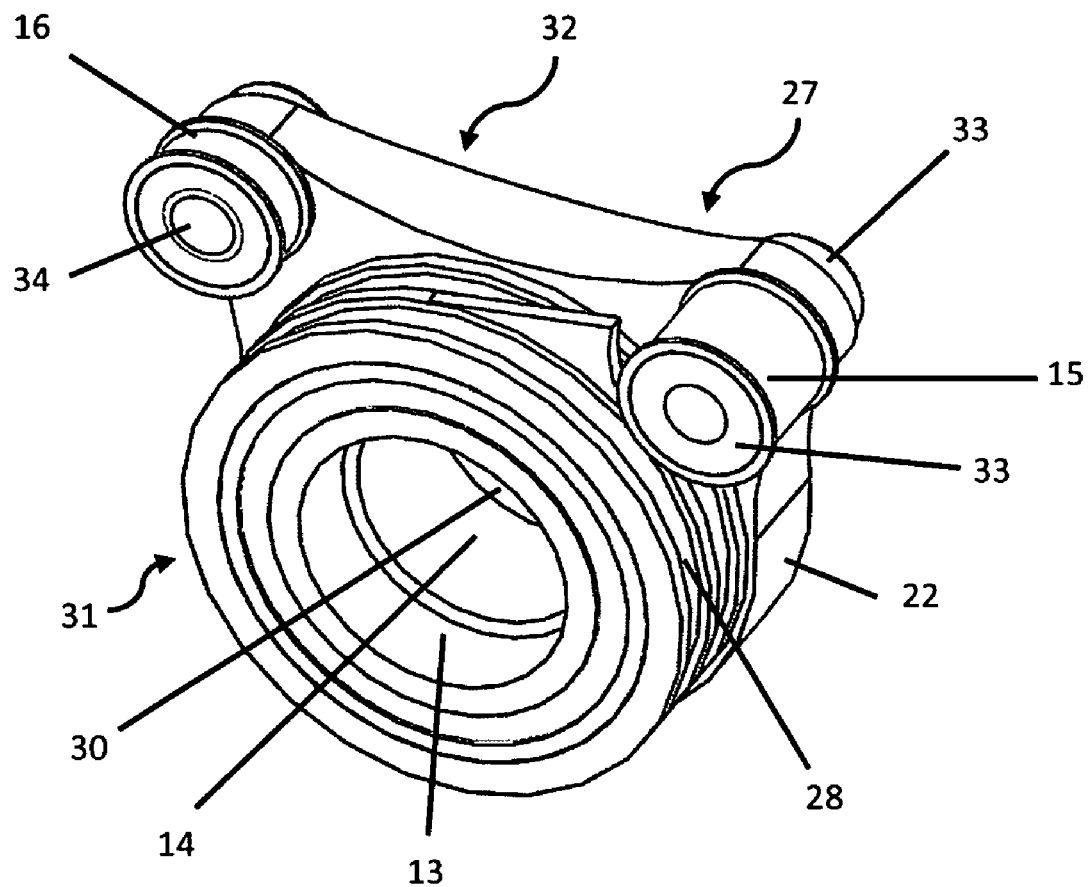
FIG. 6 is a perspective view of a sun assembly of a continuously variable transmission according to the present invention.

As seen in FIGS. 1 through 3, the sun assembly 27, as it is called herein, is at the core of the continuously variable transmission 10. As shown in FIG. 6, a sun assembly 27 comprises: a sun pulley 22, a sun pulley bearing 13, a sprag clutch 14, an input spider 11, a differential pulley 15, and a differential cable guide pulley 16. The sun pulley 22 structure comprises a generally cylindrical neck portion 31, and an extended portion 32 that extends above and substantially perpendicular to the generally cylindrical neck portion 31. The sun pulley neck portion 31 comprises a central neck portion hole 30. The sprag clutch 14 fits closely into the neck portion hole 30 in the sun pulley 22, as does the pulley bearing 13. The sprag clutch 14 is adjacent the pulley bearing 13, with a space between the two. Preferably, the sprag clutch 14 and the pulley bearing 13 are each generally cylindrical in shape, and do not extend out past the edges of the sun pulley neck portion 31. Both the sprag clutch 14 and the pulley bearing 13 have a central hole 30 through which the sun pulley shaft 12 extends. The sun assembly 27 is shown without the sun pulley shaft 12 in FIG. 6 for the purposes of illustration (see FIG. 7). The inner race of the sprag clutch 14 is fixed to the sun pulley shaft 12.

Figure 7:
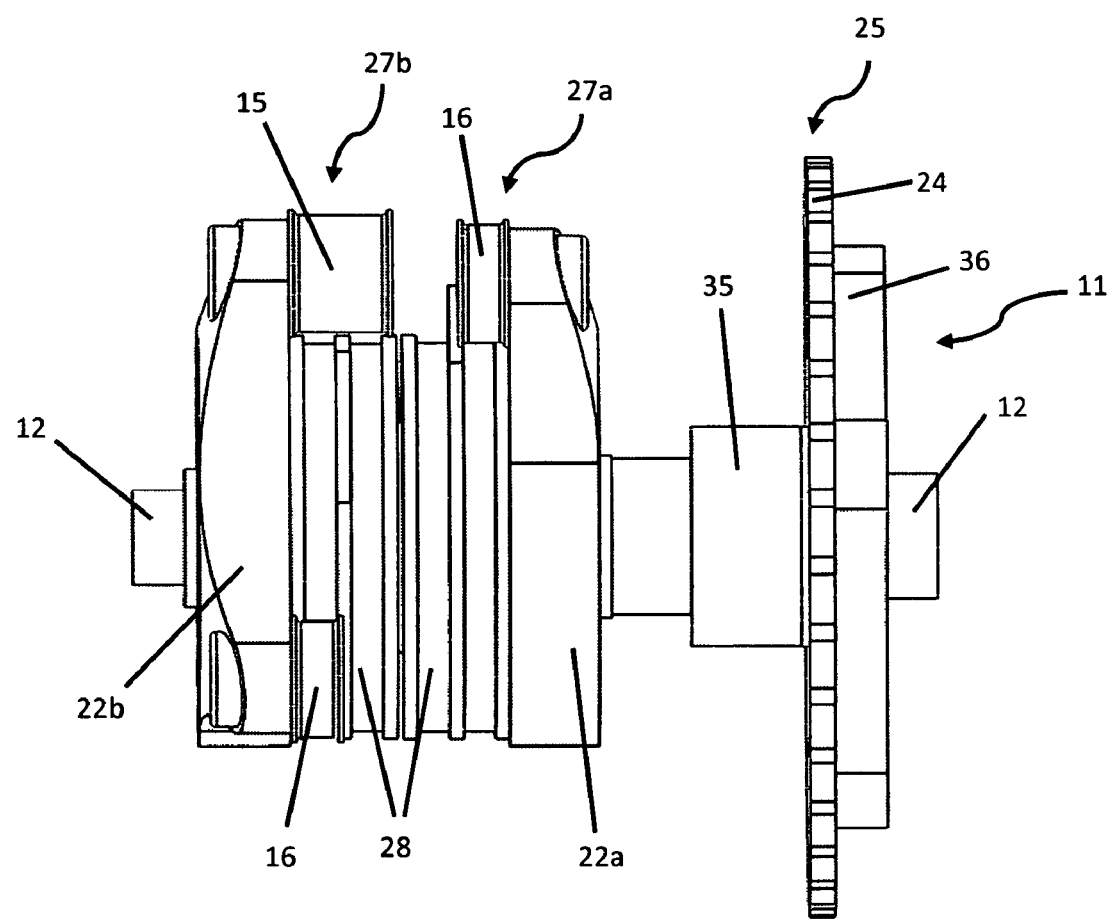
FIG. 7 is a front elevational view of an input assembly of a continuously variable transmission according to the present invention.
Figure 8:
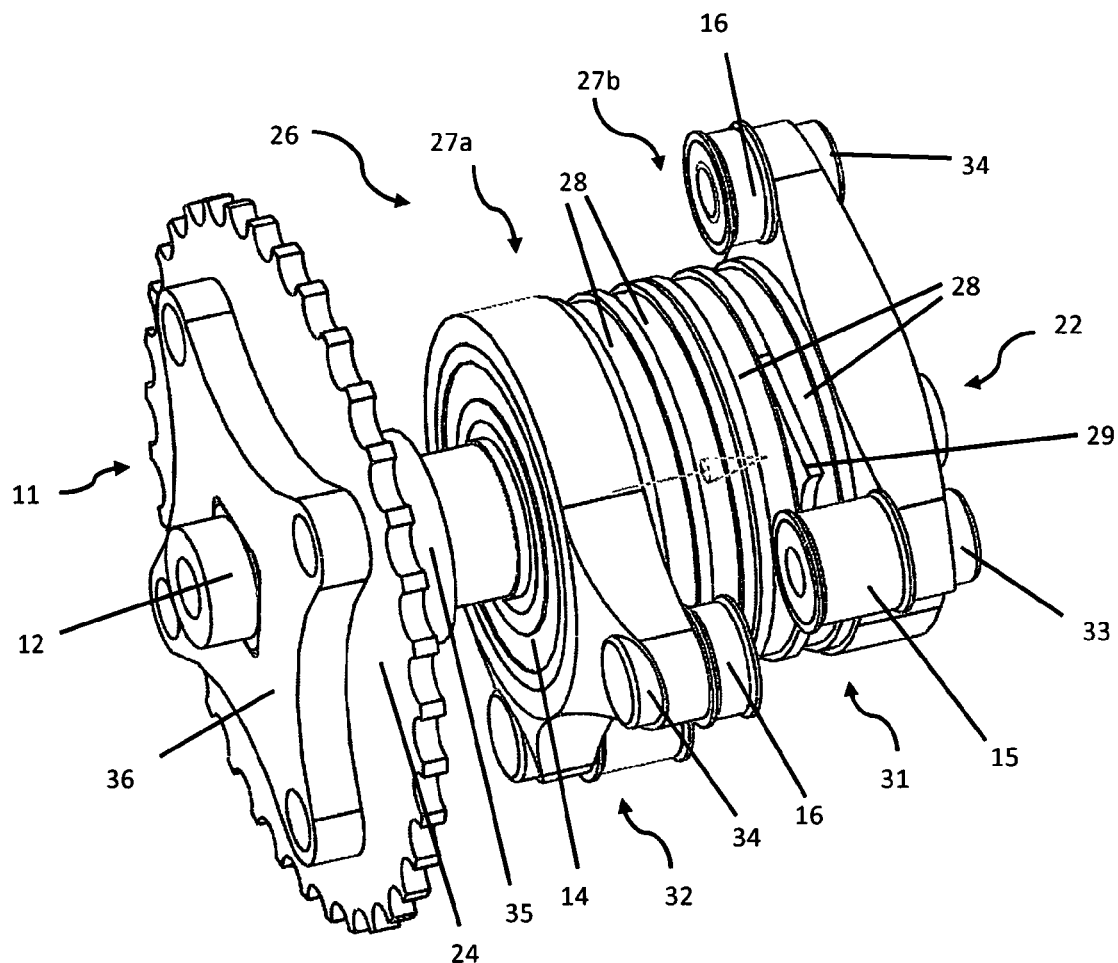
FIG. 8 is a perspective view of an input assembly of a continuously variable transmission according to the present invention.

The sun pulley 22 includes a set of sun pulley cable grooves 28 and a sun pulley fin 29, as depicted in FIGS. 6, 7, and 8. The sun pulley grooves 28 are in an outer wall of the sun pulley neck portion 31. The sun pulley grooves 28 act as a guide for the cable 41 so the cable does not move around in an undirected fashion. Preferably, the sun pulley grooves 28 are substantially parallel to one another, and each sun pulley neck portion 31 bears two adjacent sun pulley grooves 28. When the continuously variable transmission 10 is in use, one cable enters in a first groove 28 of the sun pulley 22, wraps around the differential pulley 15, and exits in a second groove 28 of the sun pulley 22. The sun pulley fin 29 prevents the cable from becoming entangled.

Figure 9:
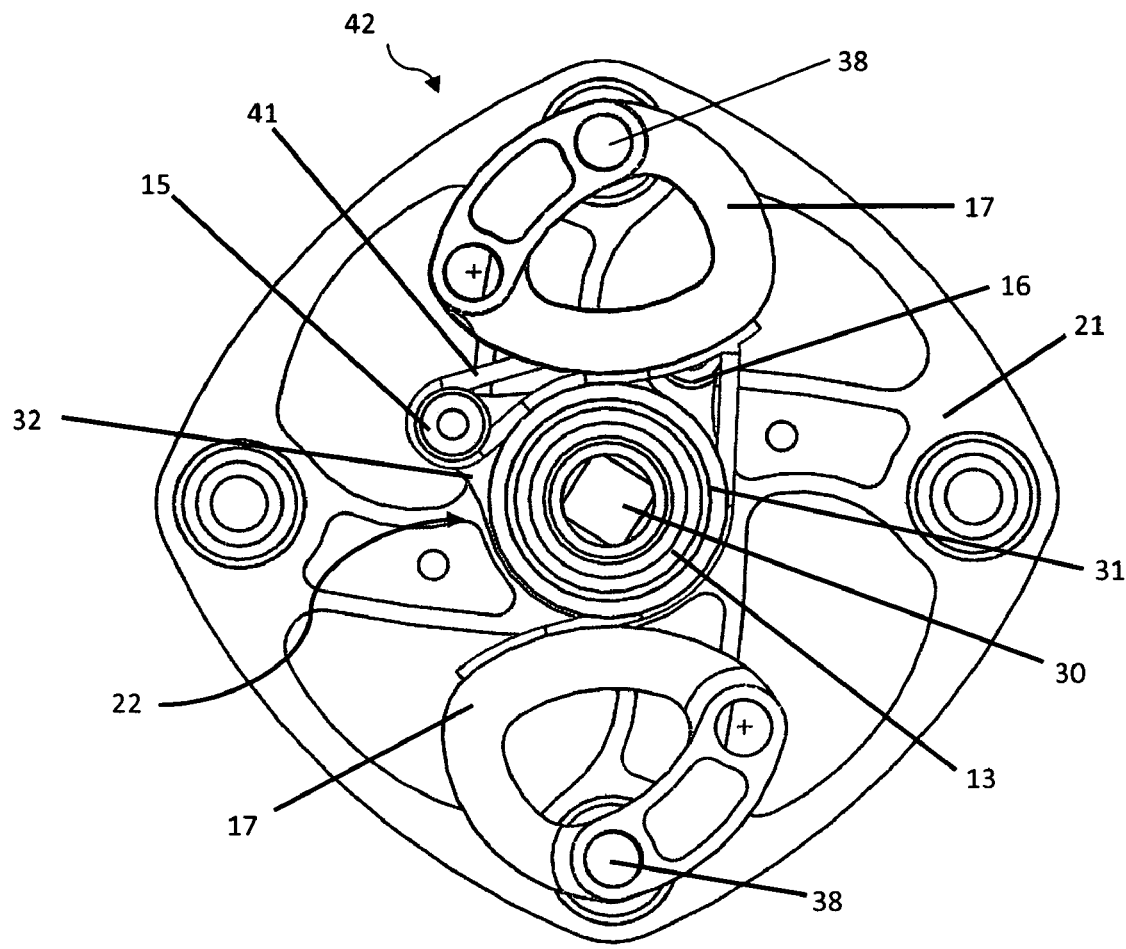
FIG. 9 is a side elevational view of a continuously variable transmission according to the present invention, shown without a cam for purposes of illustration.

The sun assembly 27 includes the differential pulley 15 and preferably at least one additional pulley, preferably the differential cable guide pulley 16, for guiding the cable when the continuously variable transmission 10 is in use. The additional pulley 16 helps to reduce cable friction and to prevent the cable from snagging. As seen in the figures, the two differential pulleys 15, 16 are preferably collinear and substantially equidistant from the sun pulley neck portion 31. The differential pulley 15 and the differential cable guide pulley 16 are each separately rotatably attached to the sun pulley extended portion 32. The differential pulley 15 is rotatably attached to the sun pulley 22 by a differential pulley bolt 33 inserted through a central hole in the differential pulley 15 and through a corresponding hole in the extended portion 32 of the sun pulley 22. Likewise, the differential cable guide pulley 16 is rotatably attached to the sun pulley 22 by a differential cable guide bolt 34 inserted through a central hole in the differential cable guide pulley 16 and through a corresponding hole in the extended portion 32 of the sun pulley 22. As seen in FIG. 9, the sun pulley fin 29 extends from between the sun pulley grooves 28 in the neck portion 31 up toward the differential pulley 15.

The purpose of the sprag clutch 14 herein is to allow the sun assembly 27 to freewheel on the sun pulley shaft 12 while the follower assembly 25, rotates in a clockwise direction (see FIG. 9). The sprag clutch is a one way clutch that only allows relative rotation between two components in one direction. No relative motion is possible in the opposite direction. The two components rotate together when the transmission 10 is on. When the follower assembly 25 rotates in a counterclockwise rotation, as it does during the active region of the external cam 23, the sprag clutch 14 is engaged, causing the sun assembly 27 and sun pulley shaft 12 to move as one.

The sun pulley bearing 13 supports the sun pulley 22 and therefore the sun assembly 27. Forces are applied to the sun assembly 27 by the cable 41 of the cable differential system 42. The cable 41 may be a cord or any other suitable device for use herein.

Analogizing the FIG. 9 view of the sun pulley neck portion 31 to a clock dial, the differential cable guide pulley 16 and the differential pulley 15 are positioned at about ten o'clock and about two o'clock, respectively, above the sun pulley neck portion 31 (the clock dial). The two differential pulleys 15, 16 extend above the sun pulley neck portion 31. The relative position of the two differential pulleys 15, 16 around the larger sun pulley 22 decreases the amount of wrap of the cable 41 in the sun pulley grooves 28. This is done so that friction is reduced and efficiency improves when the cable differential is active, and the cable 41 slides within the sun pulley grooves 28. There is at least one differential pulley 15 for each sun pulley 22.

As seen in FIGS. 1 through 3, the continuously variable transmission 10 with external cam 23 further includes what is called here an input assembly 26. Referring to FIGS. 7 and 8, the input assembly 26 includes the sun pulley shaft 12, which extends through holes in the input spider 11 and the sun pulleys 22 of the sun assemblies 27. Beginning at one end of the input assembly shown in FIG. 7, the input assembly 26 further includes: the input spider 11, a first sun assembly 27a, and a second sun assembly 27b. The input spider 11 is spaced apart from the sun assemblies 27. Ordinarily, a carrier 21 extends between the input spider 11 and the first sun assembly 27a, as seen in FIG. 1. The carrier 21 includes a central hole through which the sun pulley shaft 12 extends. The first sun assembly 27a is somewhat spaced apart from the second sun assembly 27b. There is a bearing on each end of the follower assembly 25.

As seen in FIG. 8, the input spider 11 is comprised of an input spider neck portion 35 and an extended portion 36. The input spider 11 attaches to the input cog 24. The input cog 24 is input to the continuously variable transmission 10 itself.

The sun pulley shaft 12 is a through shaft. The sun pulley shaft 12 drives the sun pulleys through the sprag clutches 14. The sun pulleys 22 rotate on the sun pulley shaft 12 in only one direction.

As seen in FIG. 1, the fully assembled transmission 10 includes an external, three-dimensional cam 23. The follower assemblies 25 and external cam 23 can be seen in FIG. 2, since the carrier 21 has been removed for purposes of illustration. FIG. 3, which for purposes of illustration does not include the cam, shows the relationship of the follower assemblies 25 and the planet pulleys 17 with the sun assemblies 27a,b.

Since the cam has been omitted for purposes of illustration, FIG. 9 shows the relationship between the planet pulley 17 of the follower assemblies 25, and the sun pulleys 22 of the sun assemblies 27. The follower rollers 19 fit into the follower assemblies 25. The action of the planet pulleys 17 is coordinated with the action of the sun pulleys 22 through the cable 41.

In its simplest inversion, a rotational input to the sun pulley shafts causes one of the sun gears to engage with the sun pulley shaft through the sprag clutches 14 when the continuously variable transmission 10 is in use. This engaged sun pulley 22 will then engage two of the follower assemblies 25 through the cable differential mechanism 42. This forces the rollers 19 onto the external cam 23, and in turn causes the carrier 21 to rotate about its axis of rotation and drive the follower assemblies 25 around the cam 23. The follower assemblies 25 will then oscillate as they move up and down the lobes of the external cam 23, causing the planet gears, as part of the follower assemblies 25, to oscillate as well. Here, the operation is similar to a planetary gear set, in which rotation of the carrier 21 depends upon the rotations of both the sun pulley 22 and the planet pulley 17. In this continuously variable transmission 10, as the planet pulleys 17 rotate in one direction, they rotate along the circumference of the sun pulley 22, thereby increasing the velocity of the carrier 21 with respect to the sun pulley 22. When the planet pulleys 17 rotate in the opposite direction as the oscillations continue, the sun gears are driven faster than the carrier 21, and are allowed to freewheel on the input shaft by the sprag clutches 14. During the engagement period, the followers are said to be in the active region of the external cam 23.

Figure 11:
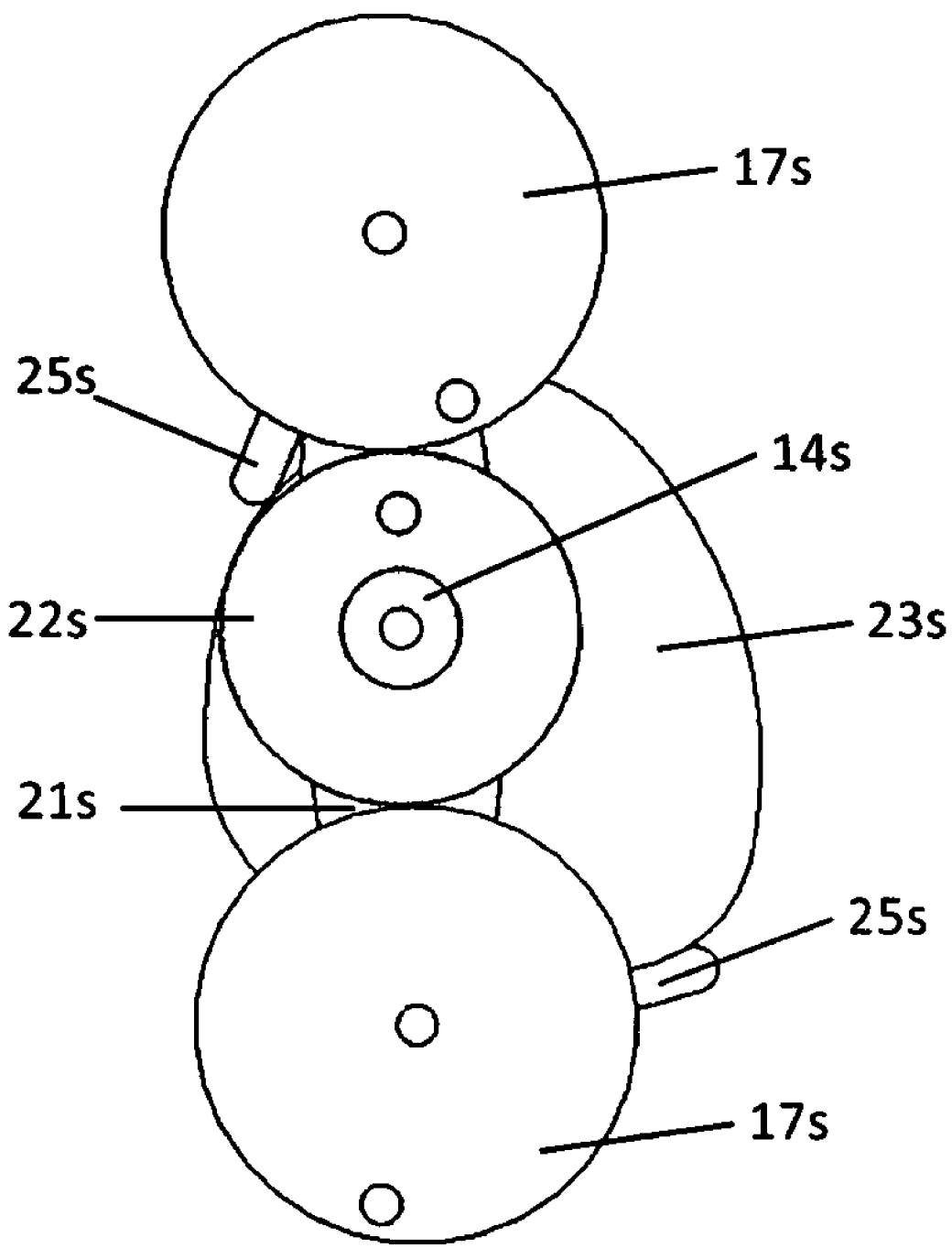
FIGS. 11-14 are schematic views of a continuously variable transmission according to the present invention, depicting various transmission components at certain points during motion.
Figure 12:
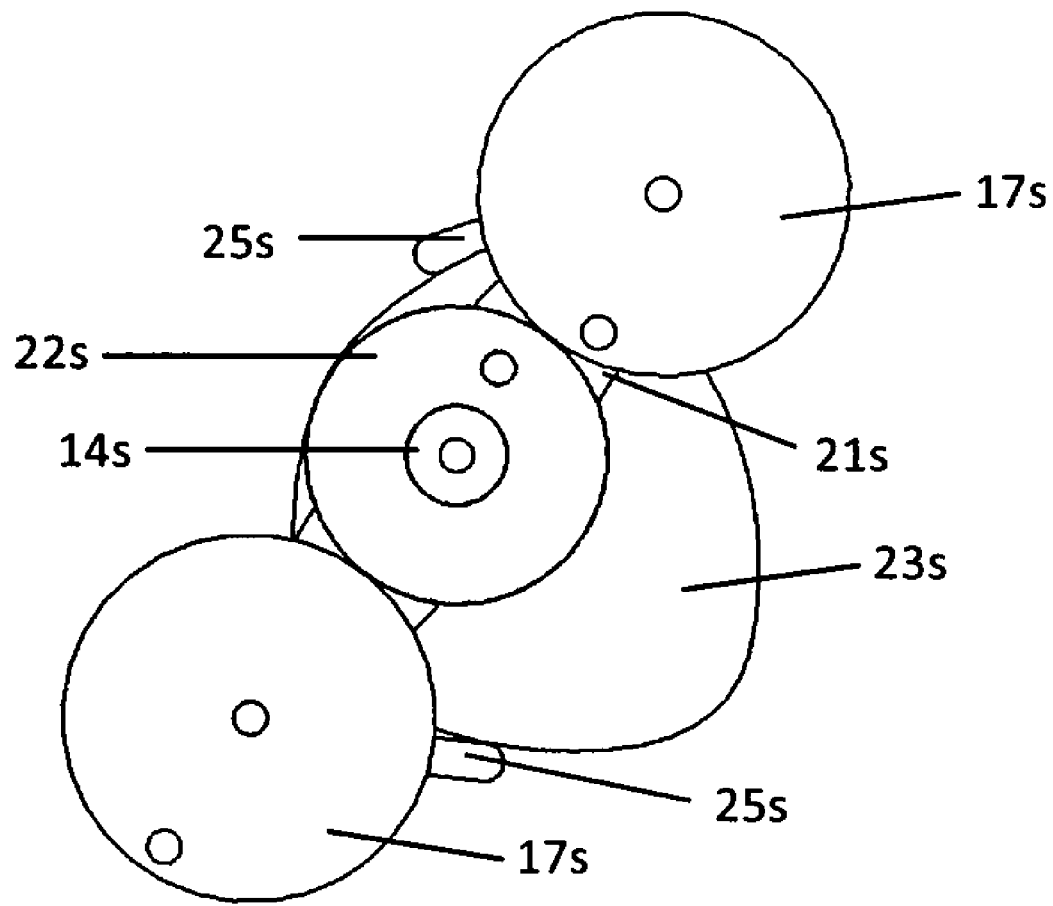
Figure 13:
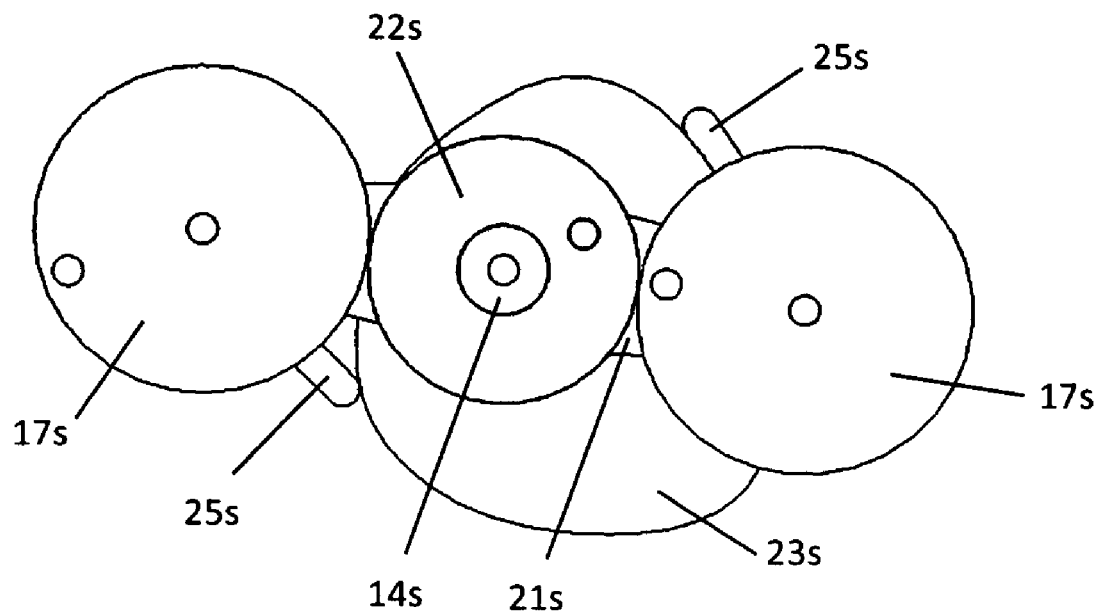
Figure 14:
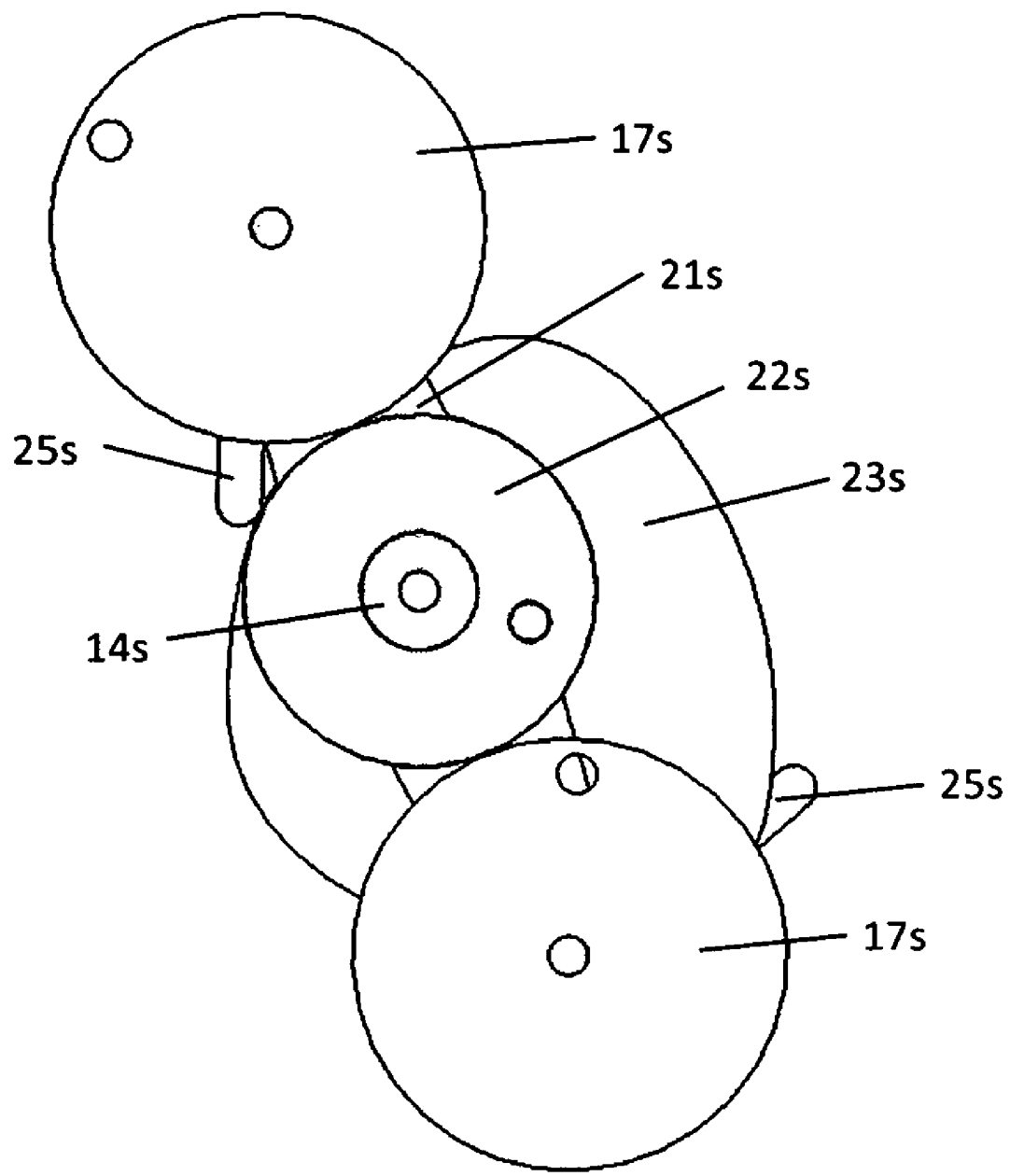

FIGS. 11 through 14 show simplified representations of the continuously variable transmission 10 at various points in its motion. The basic motion of the continuously variable transmission 10 is represented in FIG. 11. FIGS. 11 through 14 show the following in a simplified fashion ("s") for purposes of illustration: two sun gears 22s, two planet gears 17s, a single carrier 21s, two sprag clutches 14s, two followers 25s, and one cam 23s. The cable differential mechanism 42 is not shown in FIG. 11 for simplicity only. Components in FIGS. 11 through 14 include holes for the sole purpose of showing their relative motion. In FIGS. 11 through 14, one planet gear 17s and its mating sun gear 22s are out of the plane of the second set of planet gear and sun gear, such that the two sun gears are collinear. The cam 23s and followers 25s are then coplanar and are positioned behind the carrier 21s in FIGS. 11-14. The functional relationships of the components remain the same as in the full continuously variable transmission; the followers 25s are connected to the planet gear 17s, which rotates on the carrier 21s. The cam 23s is fixed, and the continuously variable transmission is driven by one of the two sprag clutches 14s at a time.

It is important to note that as the carrier rotates clockwise, the upper follower rotates clockwise to follow the profile of the external cam. This causes the planet gear to rotate clockwise with respect to the carrier, by which it rolls along the outer surface of the sun gear. This motion forces the carrier to move clockwise with respect to the sun gear. Because the carrier is the output of the continuously variable transmission, a transmission ratio greater than one is achieved. During this motion, the lower planet gear rotates counter-clockwise, causing its associated sun gear to move clockwise with a greater velocity than the aforementioned sun gear. This second sun gear therefore freewheels on the sprag clutch to which it is mounted.

By stacking an infinite series of profiles along the length of the cam to make a three dimensional cam 23, an infinite number of transmission ratios can be selected. By varying the position of the follower assemblies 25 in relation to the cam, the particular profile they follow can be changed. This affects the magnitude of the oscillations of the follower and therefore the output of the transmission.

Opposite ends of the cable 41 of the cable differential mechanism 42 are secured to the planet pulleys. The cable 41 is looped around the differential pulley 15 mounted on the sun pulley 22, which distributes tension in the cable 41 substantially equally to the two ends of the cable. The continuously variable transmission 10 preferably further includes at least one additional pulley in the sun assembly 27 around which the cable 41 is looped for reducing friction between the cable 41 and the sun pulley 22.

The external cam 23 is three dimensional and substantially surrounds the continuously variable transmission 10. The external cam 23 has an internal cam surface followed by the follower rollers 19. The internal cam surface has a substantially negative radius of curvature. The profile of the external cam 23 changes along an axial direction of the cam. One end portion of the external cam 23 is substantially circular in shape, and an opposite end portion of the external cam is substantially oblong in shape. The external cam 23 includes an active region in which the followers are loaded. This active region of the cam 23 is shaped such that the followers have a constant rotational velocity during this active region. The external cam 23 is preferably axially symmetrical. The input load is preferably substantially evenly divided between the two follower rollers 19. This permits the external cam to be axially symmetrical. The differential mechanism divides the load between the followers substantially evenly. The differential mechanism facilitates movement of the followers relative to one another and contact between the follower rollers and an internal surface of the external cam.

In the continuously variable transmission 10, it is believed that increasing the number of active rollers that are in contact with the cam 23 allows the input load to be distributed across more follower rollers 19 and therefore decreases contact stress. This is accomplished by increasing the number of followers 25, such that two followers, and hence follower rollers 19, will be active at any time.

In addition to the reduction in contact stress allowed by the dual follower assembly of the present invention, additional benefits have been found herein. Considering the static case, it is believed that the net reaction on both the cam 23 and the carrier 21 are reduced to a moment only, thereby reducing the load on any supports. Had there been only one active follower, or two active followers located adjacent to each other as opposed to across from each other, the normal forces from the followers 25 on the cam 23 would not cancel, and the resulting force can be very large (about 1000 pounds, for example).

In addition, the dynamics of the dual active follower system herein convey advantages. By placing the followers across from one another, the dynamic imbalances that could be present as the followers rotate with respect to the carrier are minimized or eliminated. This particular follower arrangement also produces a dynamically balanced axial symmetrical cam, which is ideal for inversions requiring a rotating cam. It has been found mathematically herein that moving from one to two active followers can significantly reduce contact stress.

A unique planar cable differential has been developed herein in order to split the load equally between the two followers 25 while allowing them to move relative to each other. The operation of the present transmission precludes simply placing a second planet gear on the same sun gear as the opposite follower in order to engage two followers at once for two reasons. The first is that manufacturing tolerances in the cam, carrier, or follower may allow one follower to disengage from the cam, thereby overloading the second follower. This would occur for instance if the cam surface was undersized on one side of the cam. Secondly, because of the unique shifting mechanism of this design, which allows for shifting while stopped or under load, the followers would not necessarily be on the same cam profile. Thus the one on the more aggressive profile would become the sole active follower leading to a similar overloading situation as above.

Figure 10:
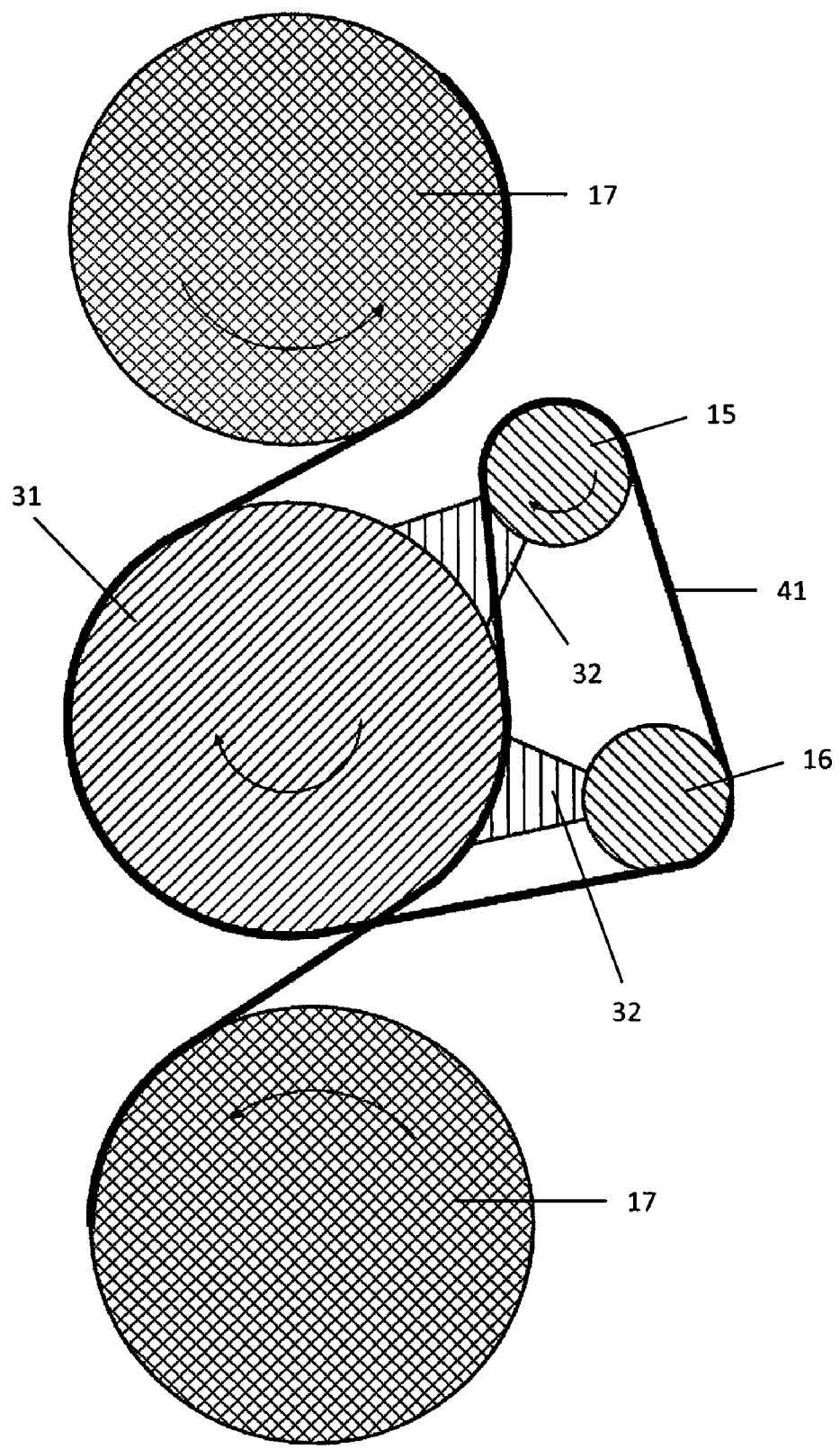
FIG. 10 is a schematic view of a representative cable differential system of a continuously variable transmission according to the present invention, showing an exemplary cable routing scheme.

A simplified representation of the cable differential system 42 is illustrated in FIG. 10, which shows one method of routing the cable 41 between the planet pulleys 17, the sun pulley neck portion 31, differential pulley 15, and differential cable guide pulley 16. Other routings of the cable that achieve the same functionality are suitable for use herein.

When the continuously variable transmission 10 is in use, one end of the cable 41 is fixed to one of the two planet pulleys 17, which are on opposite sides of the input assembly. The cable 41 is wrapped around a portion of the planet pulley 17 in the planet pulley grooves 37. The cable 41 then exits the planet pulley groove 37 and enters the sun pulley groove 28 on the sun pulley 22. The cable then wraps around the sun pulley 22 in one of the sun pulley grooves 28 and then around the differential pulley 15. From the differential pulley 15, the cable extends around the differential cable guide pulley 16 and then enters the second of the two sun pulley grooves 28. The differential cable guide pulley 16 and differential pulley 15 are rotatably attached to the sun pulley 22. From the sun pulley 22, the cable enters the second planet pulley groove 37 on the accompanying planet pulley 17. It wraps around this planet pulley 17 in the planet pulley groove 37 until it terminates and is fixed to this planet pulley 17.

Importantly, the differential pulley 15 allows the cable differential mechanism 42 to work. Without meaning to be bound by theory, it is believed that the differential pulley 15 allows tension in the cable 41 to be transferred to a torque in the sun pulley 22. The differential pulley 15 rides on a bearing that is bolted to the sun pulley 22 by pulley screw 33. The cable differential mechanism 42 permits operation of the dual active follower assemblies 25.

The cable differential mechanism 42 allows relative motion between the two planet pulleys, 17a, 17b, while still maintaining tension in the cable 41. It is believed that maintaining tension in the cable 41 is critical to the operation of the continuously variable transmission 10 because it allows the stress induced on the rollers from the input torque to be evenly split between the two active follower assemblies 25, and therefore the follower rollers 19. It is believed that failure to due so would cause one follower assembly and follower roller to support the entire reaction force to the input torque, which could lead to failure. This could occur, for example, where the follower rollers were not on the same cam profile, or if manufacturing error caused one roller to engage the cam before the second roller engages the cam. With the present cable differential mechanism 42, the follower rollers 19 do not have to be on exactly the same profile (though they can be), and therefore the constraints on the follower rollers are minimized, and the cable differential mechanism can be manufactured to a looser tolerance and more cost effectively. It has been found herein that the present cable differential system 42 is simple, lightweight, and has high torque transmissibility.

In addition to the larger size of the external cam 23 versus a conventional, internal cam, it has been found herein that a dramatic improvement in contact stress results from the spherical roller being on the inner surface of the external cam, as opposed to the outer surface of an internal cam. The spherical roller being on the inner surface of the external cam creates a negative radius of curvature. Thus, the presently concave surface of the external cam 23 provides a complementary bearing surface to the convex roller, thereby reducing contact stress.

From the foregoing it can be realized that the present invention may be easily and efficiently utilized as a continuously variable transmission. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS 10 continuously variable transmission
11 input spider
12 sun pulley shaft
13 sun pulley bearing
14 sprag clutch
15 differential pulley
16 differential cable guide pulley
17 planet pulley
18 roller shaft
19 follower roller
20 roller shaft support
21 carrier
22 sun pulley
23 external cam
24 input cog
25 follower assembly
26 input assembly
27 sun assembly
28 sun pulley grooves
29 sun pulley fin
30 central hole
31 sun pulley neck portion
32 sun pulley extended portion
33 pulley bolt
34 differential cable guide bolt
35 input spider neck portion
36 input spider extended portion
37 planet pulley groove
38 planet pulley pivot shaft
39 roller shaft support pivot
40 transmission support member
41 cable
42 differential mechanism
43 substantially circular cam portion
44 substantially oblong cam portion

What is claimed is:

1. A continuously variable transmission, comprising: (a) at least one external, three-dimensional cam; (b) at least four follower assemblies, each of the follower assemblies comprising a planet pulley, a roller shaft, and at least one follower roller, the roller shaft being mounted on the planet pulley of the same follower assembly, the roller shaft being connected to the at least one follower roller; (c) at least two sun assemblies, each of the sun assemblies comprising a sun pulley, at least one sprag clutch, and a differential pulley, the differential pulley being mounted to the sun pulley of the same sun assembly, the sun pulley driving the at least one sprag clutch of the same sun assembly; (d) an input assembly comprising a sun pulley shaft, the sun pulley shaft being connected to the at least two sun pulley assemblies through the respective sprag clutches; and (e) at least one differential mechanism connecting each of the sun pulleys to at least two of the planet pulleys; wherein the cam is external to the follower assemblies.

2. The continuously variable transmission according to claim 1, wherein each of the follower assemblies further comprises a roller shaft support, the roller shaft extending closely through holes in the planet pulley, the follower roller, and the roller shaft support, respectively, of the same follower assembly, with the follower roller between the planet pulley and the roller shaft support of the same follower assembly.

3. The continuously variable transmission according to claim 1, further comprising at least one carrier, the at least one carrier supporting the at least four follower assemblies.

4. The continuously variable transmission according to claim 1, wherein the differential mechanism comprises a cable, opposite ends of the cable being secured to the planet pulleys.

5. The continuously variable transmission according to claim 4, wherein an input to the continuously variable transmission is the sun pulley shaft, and an output from the continuously variable transmission is a carrier.

6. The continuously variable transmission according to claim 3, wherein an input to the continuously variable transmission is the carrier, and the output is the sun pulley shaft.

7. The continuously variable transmission according to claim 1, wherein the external cam is axially symmetrical, and substantially surrounds at least a portion of the continuously variable transmission.

8. The continuously variable transmission according to claim 7, wherein the external cam comprises an internal cam surface followed by the follower rollers, the internal cam surface having a substantially negative radius of curvature.

9. The continuously variable transmission according to claim 8, wherein a profile of the external cam changes along an axial direction of the external cam, such that a first portion of the external cam is substantially circular in shape, and a second portion of the external cam is substantially oblong in shape.

10. The continuously variable transmission according to claim 4, wherein two of the follower rollers are in contact with the external cam at any one time during operation of the continuously variable transmission, such that an input load is distributed across the follower rollers.

11. The continuously variable transmission according to claim 10, wherein a cable differential mechanism divides the load substantially evenly between the two follower rollers.

12. The continuously variable transmission according to claim 11, wherein the cable differential mechanism facilitates movement of the followers relative to one another and contact between the follower rollers and an internal surface of the external cam.

13. The continuously variable transmission according to claim 11, wherein the cable is looped around the differential pulley mounted on the sun pulley.

14. The continuously variable transmission according to claim 1, wherein the at least four follower assemblies are each substantially in the shape of a square U, with the roller shaft forming a base of the square U shape.

15. The continuously variable transmission according to claim 11, further comprising at least one additional, differential pulley in the sun assembly.

16. The continuously variable transmission according to claim 1, wherein a rotational axis of each of the at least four follower assemblies intersects the cam.

17. The continuously variable transmission according to claim 2, wherein an axis of rotation of each of the at least four follower assemblies is outside of the external cam.

18. The continuously variable transmission according to claim 1, wherein the follower roller is mounted on the roller shaft so that the follower roller rotates and translates along the roller shaft when the continuously variable transmission is in operation.

19. The continuously variable transmission according to claim 1, wherein each follower roller is spherical in shape, and the roller shaft is substantially parallel to the axis of rotation of at least one of the at least four follower assemblies.

20. The continuously variable transmission according to claim 1, wherein the follower rollers are each elliptical in shape, an axis of rotation of at least one of the at least four follower assemblies being collinear with a major axis of the follower rollers.

* * * * *